Feb. 14, 1928.
B. R. BENJAMIN ET AL
1,659,014
PLANTER ATTACHMENT
Filed Aug. 5, 1926
2 Sheets-Sheet 1
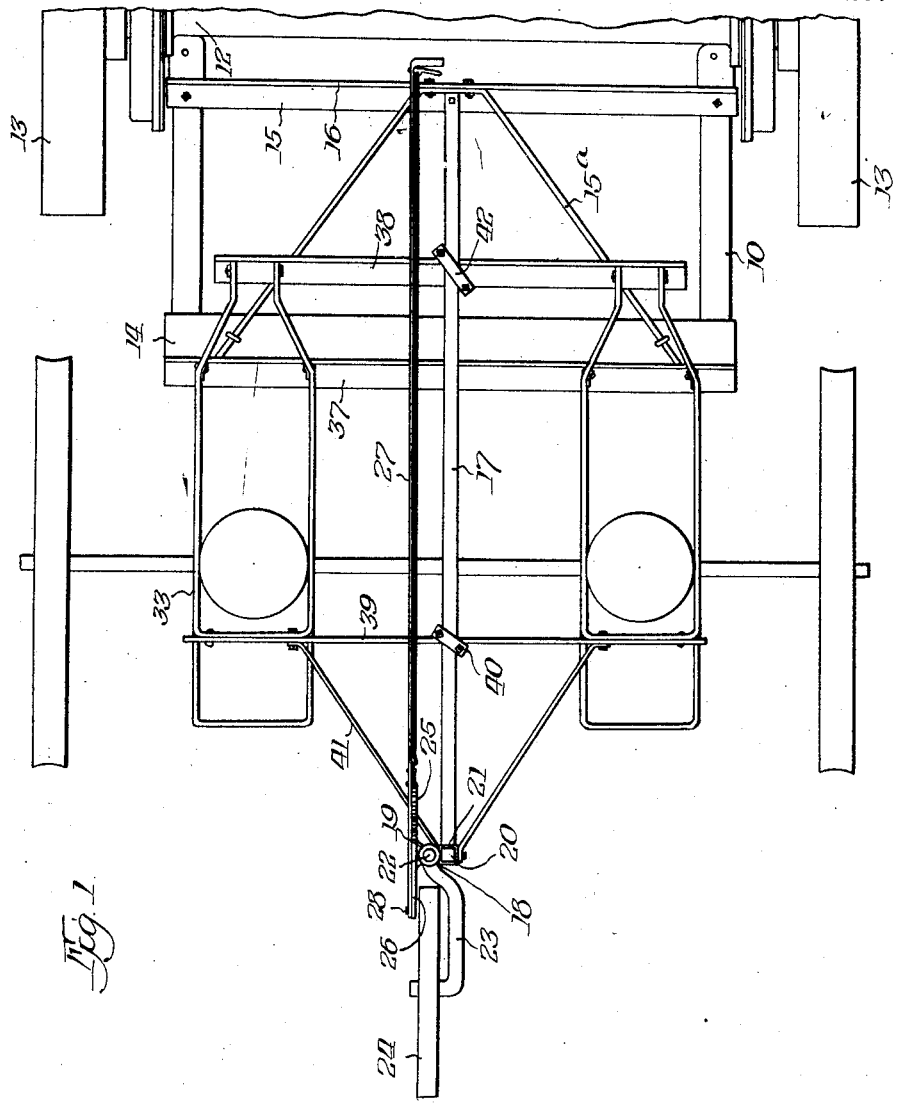
Inventors:
Bert R. Benjamin and
William S. Graham
By H. P. Doolittle
Atty.

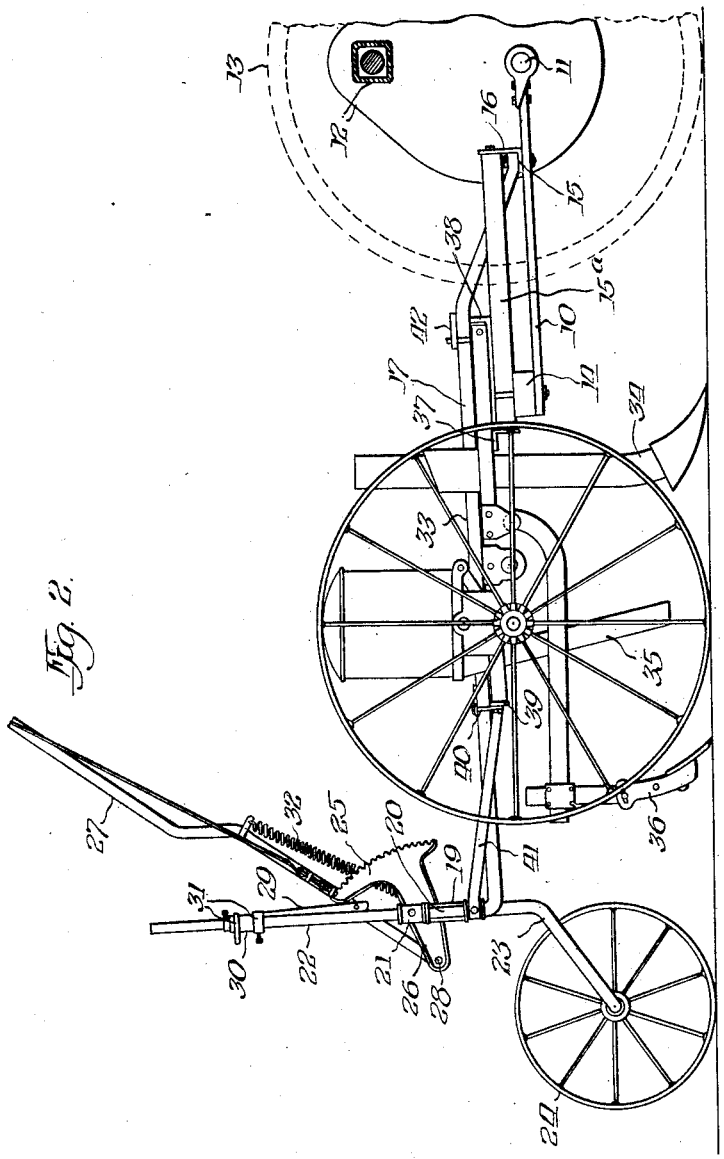

Patented Feb. 14, 1928.

1,659,014

UNITED STATES PATENT OFFICE.

BERT R. BENJAMIN, OF OAK PARK, AND WILLIAM S. GRAHAM, OF CANTON, ILLINOIS, ASSIGNORS TO INTERNATIONAL HARVESTER COMPANY, OF CHICAGO, ILLINOIS, A CORPORATION OF NEW JERSEY.

PLANTER ATTACHMENT.

Application filed August 5, 1926. Serial No. 127,223.

This invention relates to means for attaching agricultural implements to tractors and its principal object is to provide a structure that will make it possible to couple a planter of standard construction to a tractor so that the two practically constitute a unit and so that the planter is brought close up to the rear end of the tractor. Further objects of the invention are to provide simple mechanism for governing the operation of the planter from the operator's station on the tractor and for permitting short turns of the tractor without interference from the attached planter.

The foregoing and other minor objects can be attained by the organization and details of construction of the preferred embodiment hereinafter described and in which the invention defined by the claims resides.

Referring to the drawings—

Fig. 1 is a plan view showing a planter coupled to the rear end of a tractor in a manner embodying the invention; and Fig. 2 is a similar side view.

As here disclosed, the structure illustrating the invention comprises an arched or U-shaped draft bar 1 the arms of which are hinged on horizontal trunnions 11 on the inner sides of an arched rear axle structure 12 of a tractor supported on traction wheels 13. The draft bar 10 may be part of the regular tractor equipment. To this draft bar, and forming a unitary auxiliary carrying frame structure in combination therewith, are fixed a transverse beam 14 on the arch or bight of the bar 10 and a parallel bar 15 on the forward ends of the arms of the bar. The bar 15 is preferably angle iron having a wide upstanding web 16 which is braced on beam 14 by diagonal bars 15ᵃ. The carrying frame also consists of a long central longitudinal main bar 17 fixed at its front end to the bar 15 and supporting a bearing bracket 18 on its rear end. This bracket comprises a vertical bearing sleeve 19 secured to the upturned rear end 20 of the bar 17 as by two straps or collars 21. The sleeve 19 has journaled in it the vertical portion 22 of a cranked standard 23 on the lower end of which is journaled the caster wheel 24. The bracket 18 has fixed to it a rack piece 25 having a rearwardly extending arm or portion 26 on the end of which a lever 27 is pivoted at 28. A link 29 connects the lever 27 with a collar 30 held between stop collars 31 on the upper end of standard 22. A spring 32 extends between the lever and bracket and serves to assist the action of the lever when swung down to lift the auxiliary frame. Incorporated in the auxiliary frame structure and carried by the parts above described is the frame and planting units of a standard corn or cotton planter generally designated 33. This planter has the usual axle, traction wheels, and planter units driven from the axle. The usual furrow openers 34, spouts 35 and covers 36 are shown in Fig. 2, but other well known planter parts are omitted as unnecessary to understanding of the present invention. The front of the planter frame, comprising cross bars 37 and 38, extends over the beam 14 and braces 15ᵃ but the main longitudinal bar 17 preferably passes over the planter frame and is secured to its rear cross bar 39 by a suitable clamp at 40. Braces 41 connect the rear end of bar 17 with cross bar 39. A clamp 42 secures the front planter cross bar 38 to bar 17.

In the practice of the invention, the ordinary horse draft gear is moved from the planter and the auxiliary frame structure is secured thereto and this in turn secured to the arched draft bar 10 of the tractor. The planter is thus connected to the tractor so as to be movable with respect thereto on the pivots 11 in a vertical direction only. This permits the planter attachment as a whole to conform to uneven surfaces and to be raised and lowered on the caster wheel 24 through manipulation of lever 27 which is so shaped as to be always within reach of the operator on the rear of the tractor. As the planter is supported and driven by its own wheels when in lowered position it follows that raising the planter also stops its operation. When so raised the attachment is supported on the caster wheel and short turns can be made by the tractor without interference and in much less space than required with the flexibly hitched trailing attachments of the prior art.

What is claimed as new is:

1. The combination with a vehicle having rear traction wheels, of a frame supported at its rear end on a vertically shiftable caster wheel and having a forward extension located between said traction wheels and including laterally spaced arms pivoted to the vehicle on a horizontal axis, a multiple row planter including supporting wheels carried by the frame and located in advance of said caster wheel and within the space spanned by the traction wheels, and means for shifting the caster wheel to bodily move the planter supporting wheels to and from the ground.

2. The combination comprising a vehicle having rear traction wheels, a horizontally extending arched bar between the wheels with its arms pivoted to the vehicle for free vertical swing, an auxiliary frame extending rearwardly from said arched bar and rigidly secured thereto, a caster wheel supporting the rear of the auxiliary frame and shiftable vertically with respect thereto, a two-row planter secured to the auxiliary frame including supporting wheels located in the plane of the traction wheels, carried by the auxiliary frame, and means for shifting the caster wheel to bodily raise and lower the planter.

3. A structure for attaching planters of standard types to tractors comprising a main supporting bar adapted to extend in a fore and aft direction with respect to a planter frame and be secured thereto on the longitudinal median line thereof, a vertically shiftable caster wheel supporting the rear end of said bar, frame members fixed to the forward portion of said bar including laterally spaced arms adapted for connection to the rear of a tractor on a horizontal axis, and means carried by the supporting bar for shifting the caster wheel to bodily raise and lower the bar and planter.

4. A structure for attaching planters of standard types to tractors comprising a main supporting bar adapted to extend in a fore and aft direction with respect to a planter frame and be secured thereto on its longitudinal median line at points intermediate the ends of the bar, a vertically shiftable caster wheel supporting the rear end of said bar, a frame fixed to the forward portion of said bar adapted to extend between the rear wheels of a tractor including laterally spaced arms having means for horizontal pivotal connection to a tractor, and means for shifting the caster wheel including a lever having a hand piece movable in an arc approaching the front end of said main supporting bar.

In testimony whereof we affix our signatures.

BERT R. BENJAMIN.
WILLIAM S. GRAHAM.

CERTIFICATE OF CORRECTION.

Patent No. 1,659,014. Granted February 14, 1928, to

BERT R. BENJAMIN ET AL.

It is hereby certified that error appears in the printed specification of the above numbered patent requiring correction as follows: Page 1, line 27, for the mumeral "1" read "10"; page 2, lines 21 and 22, claim 2, strike out the words and comma "carried by the auxiliary frame,"; and that the said Letters Patent should be read with these corrections therein that the same may conform to the record of the case in the Patent Office.

Signed and sealed this 20th day of March, A. D. 1928.

Seal.

M. J. Moore,
Acting Commissioner of Patents.